3,282,916
POLYSACCHARIDE AND PROCESS FOR PRODUCING SAME
Gustav Richard Jansen, Scotch Plains, N.J., assignor to E. I. du Pont de Nemours and Company, Wilmington, Del., a corporation of Delaware
No Drawing. Filed Nov. 9, 1964, Ser. No. 409,952
3 Claims. (Cl. 260—209)

This invention relates to a new and useful polysaccharide and its production. More particularly, it relates to a process for its production by fermentation and its recovery and purification. This heteropolysaccharide is useful in many applications but it finds particular utility as a thickener.

There is now provided, according to the present invention, a complex polysaccharide which is produced by the process of cultivating the microorganism ATCC accession number 15192 under submerged aerobic conditions in an aqueous carbohydrate solution containing a nitrogenous nutrient, preferably for at least 12 hours, and then, if desired, recovering the so-produced polysaccharide from the fermentation broth.

A culture of the organism producing the polysaccharide of the present invention has been deposited in the reserved strain category of the American Type Culture Collection, Washington, D.C. (and assigned the ATCC accession number 15192 pending patent status). This microorganism, which is found in certain soils, appears to grow best on BBL mycophil agar. It is a spore-forming Gram positive aerobic bacillus. During growth it exudes or otherwise produces a large amount of a polysaccharide composed of ordinary sugars. Biochemical tests have not been conclusive in identifying the organism. Maltose, glucose, and sucrose are fermented to acid. It liquifies gelatin and gives an acid reaction to litmus milk. The microorganism grows fair on nutrient agar; forms a pellicle on nutrient gelatin, and forms yellow colonies on citrate agar. The indole, MRVP and urease tests are negative. Nitrate is reduced to nitrite and lactose and mannitol are not fermented.

The following taxonomic studies were made in order to better identify the ATCC accession number 15192 microorganism.

Tryptone nutrient broth: pellicle, glistening, wrinkled membrane attached to tube walls.
Color: cream.
Broth is clear until disturbed—thin sediment.
Remarks: once tube is swirled the membrane loosens from walls but remains intact. Membrane slimy, continuous—hard to tear apart.
Hanging drop: motile rod—appears to be flat with a half twist or spiral. Movement by wiggling or spiraling motion.
Capsule present: cells are packed tightly in slime matrix. Arranged palisade-like.
Gram stain: gram variable on young cells; gram positive on mature cells. Spores or microcysts are refractive and appear outlined with thick lines.
Spores may be microcysts. Oval shaped and large—are formed by cells shortening and swelling at center.
Growth at 5° C. very slight; 28–37° C. optimum growth; 50° C. no growth.
Urease test (96 hrs.): $NH_3$ produced—growth scant.
Mycophil agar slant: luxurious growth—agar surface well covered with mucoid, rubbery, glistening, wrinkled colonies.
Nutrient agar (slant): growth not abundant—surface thinly covered with mucoid, spreading growth.
Litmus milk: slight acid produced—reduction noted. Slight to no coagulation. Slight peptonization as noted by wheying off at surface.
Carbohydrate utilization:
    Sucrose broth (phenol red)—very good growth— pellicle thick and extending 8–9 mm. into broth. Acid produced—no gas.
    Lactose broth (phenol red)—no acid, no gas. Growth about one-half as that on sucrose.
    Mannitol agar (phenol red) slant—no acid—fair growth.
    Sabouraud dextrose agar—very scant to no growth after one week.
Citrate utilization: citrate not used as sole source of carbon.
Trypticase soy agar (blood agar base): stab—growth deep into stab and at surface.
Trypticase soy broth: characteristic growth not especially heavy—center of pellicle very thin while edge growth thick or heavier.
Nutrient gelatin stab:
    Line of puncture: arborescent.
    Liquefaction: slow, crateriform.
Potato dextrose agar: no growth.
MRVP: negative
Nitrate reduction (48 hrs.): nitrates reduced.
Indole productions (48 to 72 hrs.): none.
Starch utilization: growth on semisolid agar demonstrated.
Motility: positive.
Cellulose utilization: very little or no attack on cellulose fibers. Growth on agar thin or light.

In the following medium good growth and good polysaccharide production are obtained when glucose is the carbon source. Growth and polysaccharide production are also obtained when the glucose is substituted with mannose, xylose, glycerol, sorbitol, and lactose.

GROWTH MEDIUM

| | | |
|---|---|---|
| N-Z case | g./l | 2.0 |
| Fumaric acid | g./l | 2.0 |
| Yeast extract | g./l | 1.0 |
| $K_2HPO_4$ | g./l | 3.0 |
| $MgSO_4 \cdot 7H_2O$ | g./l | 0.5 |
| Mineral mix No. 1 | ml | 2 |
| Dist. $H_2O$ | ml | 920 |
| pH | | 7.0 |

80 ml. of 50% aqueous Cerelose is added after autoclaving. Mineral mix No. 1 (mg./l.):

| | |
|---|---|
| $Fe(NO_3)_3 \cdot 9H_2O$ | 720 |
| $ZnSO_4 \cdot 7H_2O$ | 440 |
| $MnSO_4 \cdot 4H_2O$ | 200 |

The following examples are intended to illustrate the production and isolation of the polysaccharide of this invention. The examples are not intended to limit the scope of this invention in any manner. All parts and percentages are by weight unless otherwise indicated.

EXAMPLE I

The microorganism ATCC accession number 15192 is transferred from an agar slant to an indented shake flask containing 200 ml. of the inoculum medium shown in Table I below, which has been previously autoclaved 20 minutes at 121° C. (15 p.s.i.). The flask is shaken for 48 hours and the contents used as inoculum for a 4 l. run.

A 7.5 l. New Brunswick fermentor assembly is charged with 4 l. of the production broth of the composition shown in Table II below. The Cerelose solution is autoclaved separately from the other components of the production broth. After autoclaving at 121° C. for 20 minutes, the Cerelose solution is added aseptically to the other components of the production broth. This production broth is inoculated with the 200 ml. culture described above, and rotary agitation is begun. Initially the agitation is maintained at 200 r.p.m. and about 1 l./min. of sterilized air introduced into the fermentor vessel. The pH of the fermenting medium is initially about 5.9. After one day the pH is adjusted to 6.50, the agitation increased to 250 r.p.m. and the sterilized air flow rate increased to 2 l./min. The viscosity of the reaction mixture is 2310 cps. after 4 days. The viscosity is measured by a Brookfield viscometer at 20 r.p.m. and 25° C. The fermentation reaction is stopped after about 115 hours, at which time the pH of the medium is 7.40, and the viscosity is 2870 cps. measured as above. The fermentation reaction is maintained at between 26° C. and 28° C. throughout the reaction.

The polysaccharide is precipitated along with cellular material by diluting the reaction mixture to 5 l. with water, then pouring it into 10 l. of 2B alcohol containing 1% by weight KI, and filtering off the precipitate.

The precipitate is purified by redissolving it in 6 l. of water, and again precipitating with 2B alcohol (12 l.) containing 1% by weight K I. The precipitate is then triturated in 80% by weight 2B alcohol, filtered, and retriturated in 100% 2B alcohol, filtered, washed with absolute alcohol, then ether, and vacuum dried to yield 17.4 g. (10.8% based on the weight of sugar in the production medium).

*Table I*

Inoculum medium:

| | |
|---|---|
| Yeast extract | 3.0 |
| Malt extract | 3.0 |
| Peptone | 5.0 |
| Glucose | 10.0 |
| Distilled $H_2O$ _____liter__ | 1 | pH unadjusted.

*Table II*

Growth medium:

| | |
|---|---|
| N-Z case | 2.0 |
| Fumaric acid | 2.0 |
| Yeast extract | 1.0 |
| $K_2HPO_4$ | 3.0 |
| $MgSO_4 \cdot 7H_2O$ | 0.5 |
| Mineral mix No. 1 _____ml__ | 2 |
| Distilled $H_2O$ _____ml__ | 920 |
| pH | 7.0 |

Add 80 ml. 50% Cerelose after autoclaving.

EXAMPLE II

In another run, 5 l. of the production broth of Table II above, autoclaved as in Example I, is distributed into 7 2.8 l. Fernbach flasks. Each flask is inoculated with 30 ml. inoculum prepared as in Example I except that the reaction period is 72 hours in this case rather than 48 hours. The flasks containing the fermentation medium are agitated on a rotary shaker at 250 r.p.m. for about 144 hours. The reaction temperature is maintained at about 28° C. Foaming is controlled by a small amount of Dow-Corning Anti-foam. At the end of the reaction, the contents of the 7 flasks are combined, and the polysaccharide isolated as in Example I to yield 60 g. (12 g./l., 30% yield based on the sugar content which is 4 g./l.) of polysaccharide.

The fermentation process is carried out under conditions which preclude contamination by foreign materials. The production medium contains from about 1% to about 5% by weight of a suitable carbon source, an organic nitrogen source, suitable phosphorus and potassium sources such as potassium dihydrogenphosphate, and appropriate trace elements. Carbon sources which may be employed include glucose, fructose, maltose, sucrose, lactose, galactose, soluble starch, corn starch, and the like. The fermentation medium is preferably agitated with a rotary shaker. A high-shearing action agitator is to be avoided. The fermentation which may take from one to six days, but usually two to five, is preferably carried out at room temperature. Temperatures above 35° C. or below 15° C. are generally unacceptable although the ATCC accession number 15192 microorganism of this invention is viable at 4° C.

At the completion of the fermentation, the next step is generally removal of the bacterial cells from the culture. Since the viscosity of the culture is generally high, separation of the cells is difficult and dilution of the culture is usually necessary. Cells may be removed by filtration or supercentrifugation. Prior to the isolation of the polysaccharide, however, it may be considered feasible to kill the bacteria. This may be accomplished by autoclaving the entire reaction mixture prior to work-up or by adding to the reaction mixture a bacteriacide such as hexachlorophene or formaldehyde. Destroying the bacteria may be essential for many end-use applications of the product, for example, as a thickener in hygienic compositions. Examples I and II illustrate the filtration method of product isolation. Where super-centrifugation is employed, the entire reaction mixture is diluted with water until the viscosity is less than about 700 cps. The diluted reaction through a Sharples centrifuge 2 to 3 times. The centrifugate is somewhat turbid and still contains some bacterial cells. The polysaccharide is then precipitated from this material and then purified in a manner similar to that described in Example I.

The analysis of the heteropolysaccharide of this invention, both quantitatively and qualitatively, is done in the following general manner:

A sample of the isolated polysaccharide in dry form is hydrolyzed under acid conditions for at least six hours, the pH of the hydrolyzate is adjusted to about 5–5.5 with solid $BaCO_3$, and then centrifuged. The precipitate is washed carefully to insure that all of the free sugars are collected, and the washings added to the supernatant from the centrifugation and evaporated to dryness. In this manner, quantitative isolation of the free sugars is effected. The residue is then re-dissolved in a 10% isopropanol-water solution and pH adjusted 0 to 6.0. The sample is spotted on whatman #1 filter paper (pretreated with 0.1 M $NaH_2PO_4 \cdot H_2O$ buffer) and chromatographed with a suitable solvent consisting of n-butanol, pyridine, and water (ratio 6:4:3). The component sugars are identified qualitatively by comparison of distances travelled on the paper for the various sample components with distances travelled for a standard sugar solution. Once the free sugars for the polysaccharide of this invention are qualitatively identified, an instrument known as the Spinco Model RB Analytrol which is able to evaluate colored or stained materials along a paper strip is employed for the quantitative determination. The Analytrol combines two functions: one, a calibrated densitometer, and two, an automatic integrator. Standard curves for the sugars known to be present are obtained, and by comparison of these with data obtained from the test samples, a quantitative analysis of the free sugars in the polysaccharide is obtained.

The results of this analysis are given in Table III below where all values except for acetyl content are expressed in milligrams. All other analyses shown in Table III were obtained using standard procedures.

Table III
COMPOSITION OF POLYSACCHARIDE PRODUCED BY ATCC ACCESSION NO. 15192 ORGANISM

| Sample Weight (mg.) | Glucuronic | Glucose | Mannose | Xylose | Ash | Nitrogen | Protein | Acetyl (percent by weight) |
|---|---|---|---|---|---|---|---|---|
| 289 | 80 | 65 | 87.5 | 39.5 | 5.4 | 0.64 | 4.00 | 4.3 |

The molecular weight of the polysaccharide of this invention as determined by light scattering is between 3 and 4 million. Difficulty in determining molecular weight is encountered due to the fact that sufficient concentrations of the polysaccharide in suitable form for the determination are not easily obtained. The equivalent weight of the polysaccharide of this invention, determined by conductance, is about 1300.

The polysaccharide of this invention forms highly viscous aqueous solutions. At 1% concentration the viscosity is about 10,000 cps. measured with a Brookfield viscometer at 20 r.p.m. and 25° C. Films can be cast from freshly prepared solutions in formic acid, and, when plasticized with 30 parts glycerol, give tensile strengths up to about 5000 p.s.i. with 5% elongation.

The polysaccharide of this invention confers marked aggregate stability to soils, particularly in the presence of sodium silicate. The percent aggregate stability was determined by applying an aqueous solution of the polysaccharide to dry soil, forming a dough which was aged one hour before passing through a 5 mm. round hole screen, freezing to −10° C., thawing for 1 hour, refreezing and rethawing, then drying at 40° C. in an air circulating oven for 24 hours. Aggregates retained on a 3 mm. round hole screen are then charged to 9 mesh over 32 mesh Bureau of Standards sieves, and the sieves are immersed in water for 1 minute to soak the crumbs in the top sieve. The sieves are then raised and lowered through a ¾ inch stroke 35 times a minute for 2 minutes. The soil remaining on the sieves is dried and weighed and the aggregate stability is defined as the percent of the original charge retained on the sieve. The following results are obtained using the polysaccharide of this invention on a silty clay subsoil containing 0.37% C. and 0.02% N.

Table IV
EFFECT OF POLYSACCHARIDE ON SOIL AGGREGATE STABILITY

| | Percent Retained on 9 Mesh Sieve | Percent Retained on 32 Mesh Sieve |
|---|---|---|
| Soil | 0 | 0.3 |
| Soil+0.2% Na$_2$SiO$_3$ | 0 | 0 |
| Soil+0.05% Polysaccharide | 35 | 67 |
| Soil+0.05% Polysaccharide+0.2% Na$_2$SiO$_3$ | 94 | 95 |

Since the polysaccharides of this invention is anionic, changes in pH have a marked effect on the viscosity of aqueous solutions. Viscosity decreases with an increase in hydrogen ion or hydroxyl ion concentration.

The viscosity of aqueous solutions of the polysaccharide of this invention appear to be relatively stable to salts such as sodium chloride.

The polysaccharide of this invention, which contains about 4.3% by weight of acetyl groups, can be further acetylated in a conventional manner using acetic anhydride in pyridine. Products having acetyl contents of 13.6% and 40.9% by weight have been obtained. The acetylated derivatives show an increased ethanol tolerance which makes their use as cosmetic thickeners even more attractive. Most water-soluble polysaccharides are readily precipitated by ethanol.

Due to the above properties, the polysaccharide of this invention finds utility in many and varied ways. It can be used in many applications where thickening of aqueous solutions is desired, such as in pharmaceutical preparations. It has utility as a soil conditioning agent as noted above by promoting aggregate stability of soil particles which in turn permits more productive growth of plants, especially in silty or clay soils. The polysaccharide also can be used as thickening agents for water used in secondary recovery operations carried out in the petroleum industry. It has been found that this polysaccharide added to water or brine in suitable concentrations produces viscous solutions which are relatively stable under the conditions which prevail in subsurface oil reservoirs. By utilizing a solution of controlled viscosity in place of the water or brine normally employed in water-flooding projects, a favorable mobility ratio between the oil in the reservoir and the liquid used to displace it can be obtained. The tendency of the displacing medium to finger through highly permeable sections of the reservoir without displacing oil from the less permeable sections is greatly decreased. Viscous forces which normally reduce the displacement efficiency in portions of the reservoir through which the displacing medium actually passes are more readily overcome. As a result of these effects, the use of water or brine containing polysaccharide thickening agents generally permits the recovery of significantly greater quantities of oil during waterflooding than can be recovered with water or brine alone.

It is to be understood that for the production of the polysaccharide this invention is not limited to the particular microorganism ATCC accession number 15192 but particularly includes the use of microorganisms which are natural isolates, variants or mutants produced from the described microorganism by mutating agents such as X-radiation, ultraviolet radiation and nitrogen mustards.

As many widely different embodiments of this invention may be made without departing from the spirit and scope thereof, it is to be understood that this invention is not limited to the specific embodiments thereof except as defined in the appended claims.

What is claimed is:

1. The process of producing a complex polysaccharide, which comprises cultivating the microorganism ATCC accession number 15192 under submerged aerobic conditions in an aqueous carbohydrate solution containing a nitrogenous nutrient at a temperature of substantially from 22° to 32° C. and for between about one and six days.

2. The process of producing a complex polysaccharide, which comprises cultivating the microorganism ATCC accession number 15192 under submerged areobic conditions in an aqueous carbohydrate solution containing a nitrogenous nutrient at a temperature of substantially from 22° to 32° C. and then recovering from the broth the polysaccharide thus produced.

3. The polysaccharide produced by the process of claim 1.

References Cited by the Examiner
UNITED STATES PATENTS

| | | | |
|---|---|---|---|
| 3,054,689 | 9/1962 | Jeanes et al. | 195—31 X |
| 3,060,099 | 10/1962 | Schmitz et al. | 195—31 X |

A. LOUIS MONACELL, *Primary Examiner.*

A. E. TANENHOLTZ, *Assistant Examiner.*